US011852350B1

(12) United States Patent
Klok

(10) Patent No.: US 11,852,350 B1
(45) Date of Patent: Dec. 26, 2023

(54) HORIZONTAL INJECTOR FOR AIRCRAFT STEAM OVEN

(71) Applicant: Koninklijke Fabriek Inventum B.V., Nieuwegein (NL)

(72) Inventor: Martijn Klok, Boskoop (NL)

(73) Assignee: B/E Aerospace, Inc., Winston-Salem, NC (US)

(*) Notice: Subject to any disclaimer, the term of this patent is extended or adjusted under 35 U.S.C. 154(b) by 1174 days.

(21) Appl. No.: 16/245,481

(22) Filed: Jan. 11, 2019

(51) Int. Cl.
*F24C 15/32* (2006.01)
*B64D 11/04* (2006.01)

(52) U.S. Cl.
CPC ............ *F24C 15/327* (2013.01); *B64D 11/04* (2013.01)

(58) Field of Classification Search
None
See application file for complete search history.

(56) References Cited

U.S. PATENT DOCUMENTS

| | | | |
|---|---|---|---|
| 5,209,941 A | 5/1993 | Wuest | |
| 5,530,223 A * | 6/1996 | Culzoni et al. | A21B 3/04 219/401 |
| 7,093,592 B2 | 8/2006 | Cho | |
| 8,581,151 B2 | 11/2013 | Miller | |
| 2010/0224083 A1* | 9/2010 | Yasuhara | A47J 27/04 99/476 |
| 2010/0224616 A1 | 9/2010 | Yasuhara | |
| 2010/0230396 A1 | 9/2010 | Boubeddi et al. | |
| 2010/0301034 A1 | 12/2010 | Greenwood et al. | |
| 2012/0160111 A1 | 6/2012 | Hozumi et al. | |
| 2013/0259455 A1* | 11/2013 | Schootstra et al. | F22B 3/00 392/394 |
| 2016/0061458 A1* | 3/2016 | van der Linden | F24C 15/32 |
| 2018/0153329 A1* | 7/2018 | Glucksman et al. | A47J 27/08 |

FOREIGN PATENT DOCUMENTS

| | | |
|---|---|---|
| DE | 2842771 A1 | 4/1980 |
| DE | 202004000106 U1 | 6/2004 |
| DE | 102009000275 A1 * | 7/2010 ............. F24C 15/327 |
| DE | 102014217024 A1 * | 3/2016 ............. F24C 15/327 |
| EP | 0653593 A1 | 5/1995 |
| EP | 2236942 A1 | 10/2010 |
| WO | WO 2013019734 A2 * | 2/2013 .............. F24C 15/16 |

OTHER PUBLICATIONS

Machine translation of DE 102014217024 A1 performed on Feb. 10, 2022, Bleier et al. (Year: 2016).*
Machine translation of DE 102009000275 A1 performed on Jul. 25, 2022, Erdmann (Year: 2010).*
Extended Search Report dated Jun. 9, 2020 for EP Application No. 19219044.

* cited by examiner

*Primary Examiner* — Brian W Jennison
*Assistant Examiner* — Kevin Guanhua Wen
(74) *Attorney, Agent, or Firm* — Suiter Swantz pc llo

(57) ABSTRACT

A steam oven for a mobile platform (e.g., sized for a galley insert in an aircraft galley) injects water into the oven cavity to generate steam. The water is injected as a horizontal jet over a fan and into an opposing baffle plate, where a portion is heated on contact and immediately evaporates into steam. The steam is then distributed throughout the oven cavity by the fan. The unevaporated portion is drawn downward into the fan, where it too is distributed throughout the oven cavity rather than collecting on the cavity floor. Rather than building up within the injector, scale accumulates on the baffle plate where it may easily be cleaned or removed.

12 Claims, 5 Drawing Sheets

HORIZONTAL INJECTOR FOR AIRCRAFT STEAM OVEN

BACKGROUND

Steam ovens configured for use aboard an aircraft or other vehicle may incorporate a means of generating steam within the oven cavity. The generated steam allows food placed in the oven cavity (which may be chilled, frozen, portioned, or otherwise prepared in advance) to be heated or regenerated within a minimal time window, e.g., immediately before serving. Alternatively, steam may be generated outside the oven cavity and injected thereinto. For example, conventional steam ovens, whether pressurized or pressure-free, utilize a steam injector system having a nozzle with an internal bend, e.g., a 90-degree bend, such that the nozzle sprays steam and/or heated water downward onto a motorized fan; the fan creates an airflow which spreads the steam throughout the oven cavity. However, such a downward-oriented nozzle must be carefully aligned and oriented. Further, unevaporated portions of the injected water may bypass the fan and reach the bottom of the oven cavity, where the water must be drained. The internal bend of the steam injector nozzle may accumulate scale (e.g., limescale or calcium carbonate deposits due to hard water) which renders the nozzle susceptible to clogging. Regular cleaning of the nozzle may prevent clogging due to scale accumulation, but the nozzle must always be disassembled or removed for cleaning.

SUMMARY

In one aspect, embodiments of the inventive concepts disclosed herein are directed to a horizontal injector system for a steam oven installable aboard an aircraft (e.g., as a galley insert) or other like mobile platform. The steam oven comprises a housing with a forward front door, the door operable to access the oven cavity. The oven cavity may include a baffle plate extending substantially vertically, e.g., along a tray carrier or similar internal structure positioned within the oven cavity. Steam is generated within the oven cavity by injecting water directly into the baffle plate in a horizontal jet. For example, the injector nozzle may be attached or set into a rear surface of the oven cavity proximate to a fan, with the baffle plate directly opposite such that the water jet passes over the fan. A portion of the injected water immediately evaporates on contact with the hot baffle plate and is distributed throughout the oven cavity. The remaining unevaporated portion drips downward along the baffle plate toward the fan, where it is also distributed throughout the oven cavity rather than collecting on the cavity floor.

In a further aspect, embodiments of the inventive concepts disclosed herein are directed to a steam oven installable aboard an aircraft (e.g., as a galley insert) or other mobile platform. The steam oven comprises a housing with a forward front door, the door operable to access the oven cavity. The oven cavity may include a baffle plate extending substantially vertically, e.g., along a tray carrier or similar internal structure positioned within the oven cavity. Steam is generated within the oven cavity by injecting water directly into the baffle plate in a horizontal jet. For example, the injector nozzle may be attached or set into a rear surface of the oven cavity proximate to a fan, with the baffle plate directly opposite such that the water jet passes over the fan. A portion of the injected water immediately evaporates on contact with the hot baffle plate (which is proximate to a convective heating element) and is distributed throughout the oven cavity. The remaining unevaporated portion drips downward along the baffle plate toward the fan, where it is also distributed throughout the oven cavity rather than collecting on the cavity floor.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
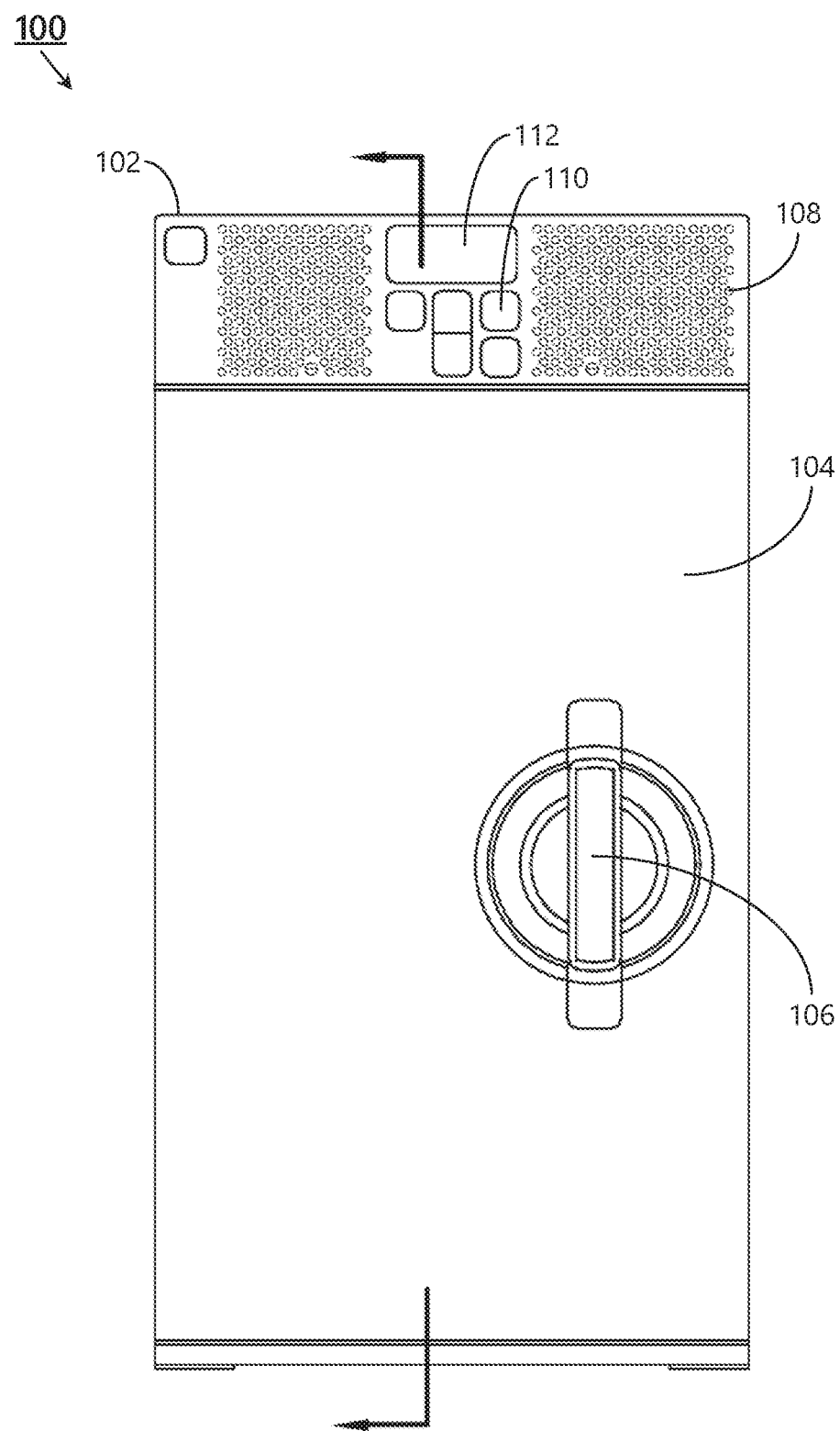
FIG. 1 illustrates a forward exterior view of a pressurized steam oven incorporating a horizontal steam injector system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a horizontal steam injector system for a galley-based steam oven for use aboard an aircraft or other vehicle. The steam oven may be pressurized or pressure-free. The steam injector system is both reduced in complexity and easier to clean, propelling water horizontally into an adjacent baffle plate, where the water is either heated to evaporation by contact or directed downward into the fan for rapid dispersal throughout the oven cavity. The nozzle is less susceptible to internal clogging and may be cleaned without removal from the oven cavity.

Referring to FIG. 1, an exemplary embodiment of a horizontal steam injector system 100 may be housed within a steam oven 102. The exterior housing of the steam oven 102 may be sized for insertion into an aircraft galley or for use aboard a similar vehicle. The interior of the steam oven 102 may be accessed via a door 104 (opened via a handle 106) defining the forward face of the steam oven. The steam oven may further include air inlets 108 and a human-machine interface (HMI) for control of oven operations and functions (e.g., control buttons 110 and a display unit 112). The steam oven may be pressurized in that the door 104 may be capable of creating a seal via which the interior of the steam oven 102 may be raised to a higher pressure than outside the steam oven.

Figure 2:
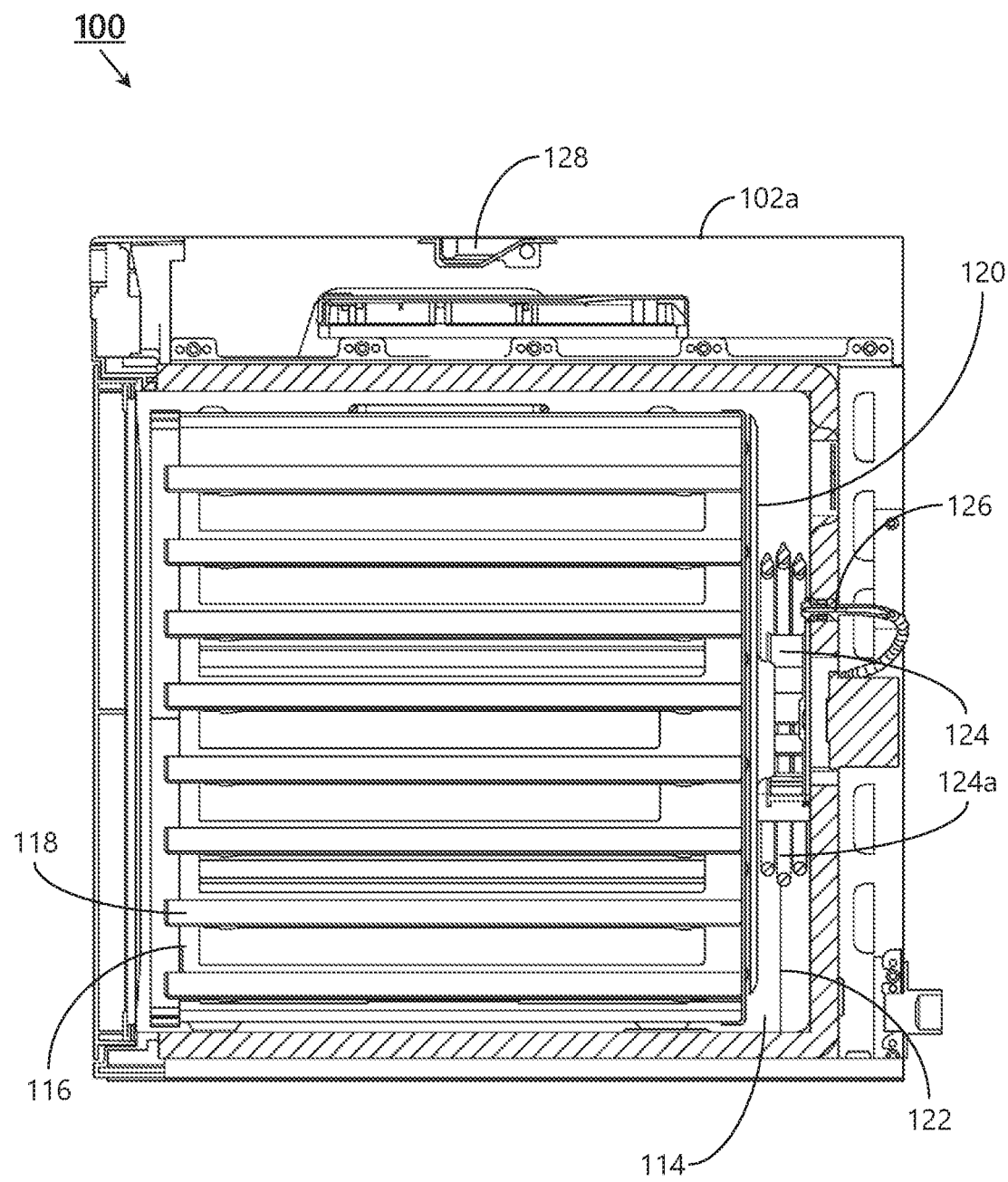
FIG. 2 is a left side cross-section view of the pressurized steam oven of FIG. 1.

Referring to FIG. 2, the steam oven 102a may be implemented and may function similarly to the steam oven 102 of FIG. 1, except that the steam oven 102a may include an oven cavity 114, a meal carrier 116 or similar internal structure within the oven cavity, a series of meal trays 118 removably insertable into the meal carrier, and a baffle plate 120 attached to the rear of the meal carrier and extending substantially vertically (e.g., parallel to the rear wall 122 of the oven cavity). A fan 124 may be positioned between the baffle plate 120 and the rear wall 122; the fan may be motor-driven to create airflow throughout the oven cavity 114, rapidly and evenly distributing steam throughout the oven cavity (e.g., throughout apertures in the meal carrier 116 and between individual meal trays 118) and quickly heating or regenerating portions of food placed therein. Similarly, the fan 124 and baffle plate 120 may be situated proximate to the left or right side wall of the oven cavity 114 instead of the rear wall 122. A heating element 124a (e.g., a coil or like convective heating element) may surround the fan 124 to heat air and steam circulating through the oven cavity 114.

The horizontal steam injector system 100 may include an injector nozzle 126 capable of injecting steam (e.g., which may include heated or unheated water) into the oven cavity 114 when the cavity is under pressure. For example, closing and sealing the oven door 106 may create a pressure seal or hermetic seal within the oven cavity 114, such that the interior of the oven cavity may be maintained at a higher pressure than the environment external to the steam oven 102a. Steam may then be injected into the oven cavity 114 through the injector nozzle 126 and directly into the baffle plate 120 opposite the injector nozzle. In some embodiments, the steam oven 102a may be portable via a carrying handle 128 built into the top surface.

Figure 3A:
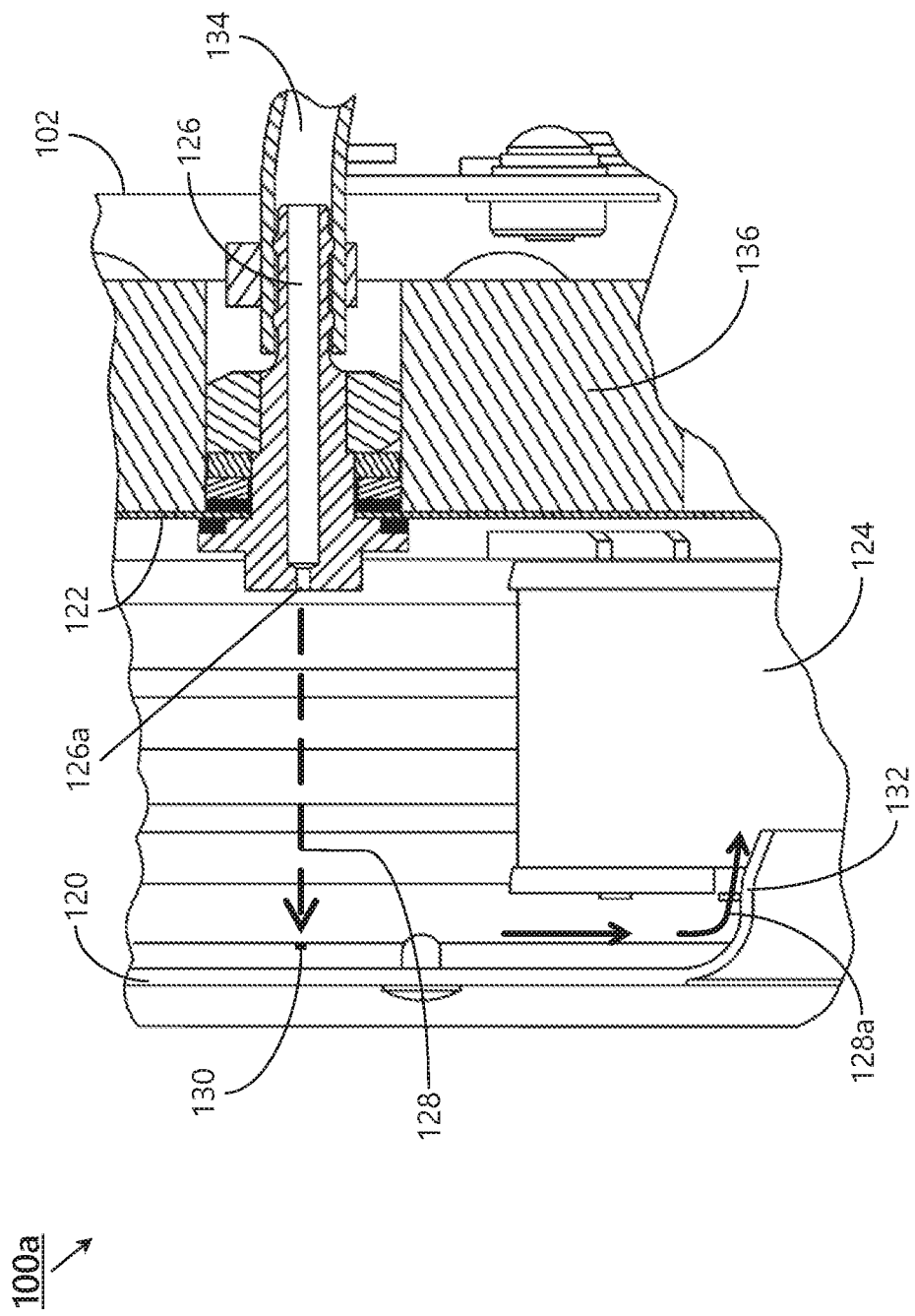
FIGS. 3A and 3B are respectively a left-side cross-section detail view and an isometric detail view of the horizontal steam injector system of FIG. 1.
Figure 3B:
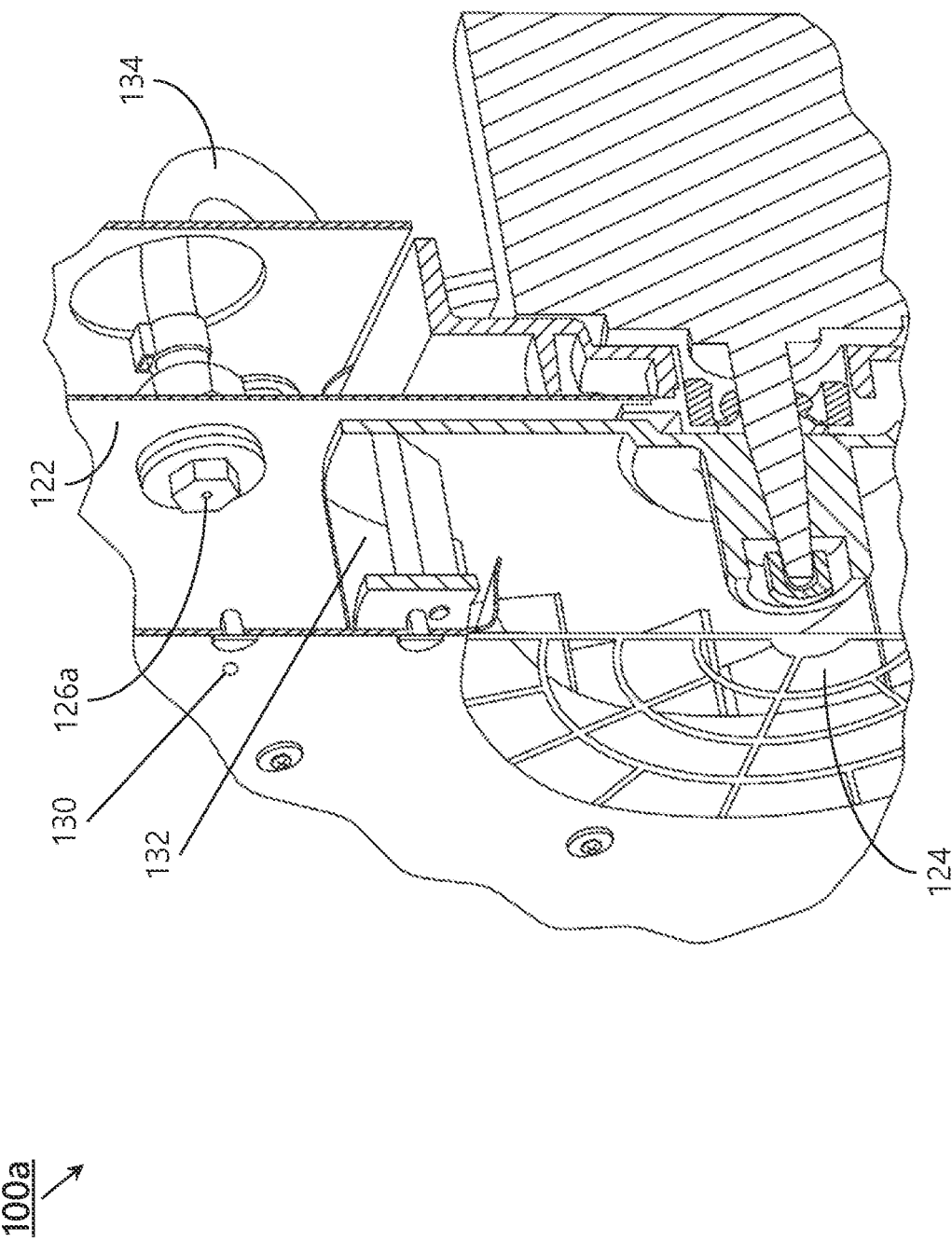

Referring to FIGS. 3A and 3B, the horizontal injector system 100a may be implemented and may function similarly to the horizontal injector system 100 of FIGS. 1 and 2, except that the injector nozzle 126 of the horizontal injector system 100a may be situated into the rear wall 122 such that steam or water traveling through the injector nozzle approaches the rear wall at a substantially horizontal angle and is ejected (through an ejection point 126a) into the oven cavity 114 in a horizontal jet 128 of water and/or steam directly into the baffle plate 120. For example, the horizontal jet 128 may contact the baffle plate 120 at a particular contact point or area 130 directly opposite the ejection point 126a and directly above the fan 124. A portion of the horizontal jet 128 may immediately evaporate into steam upon contact with the baffle plate 120 (which has been heated by proximity to the heating element (124a, FIG. 2)), the steam distributed throughout the oven cavity 114 by the fan 124. A smaller portion of the horizontal jet 128, e.g., a portion that does not immediately evaporate, may drip or flow downward along the baffle plate 120 to be sucked into the fan 124, via which the non-evaporating portion is also distributed throughout the oven cavity 114 without any portion reaching the bottom surface of the oven cavity (from which the resulting water would require draining). The baffle plate 120 or the fan 124 may further be fitted with a collector 132, e.g., a structure for directing the non-evaporating portion of the horizontal jet 128 downward (128a) along the baffle plate and toward the fan. The injector nozzle 126, and a supply tube 134 (which may be rigid or flexible) for supplying steam and heated water to the oven cavity 114, may be fastened to (e.g., clamped to, screwed or otherwise threadedly fastened to) a corresponding hole in the rear wall 122 of the oven cavity (as well as any insulation 136 separating the rear wall from the exterior housing of the steam oven 102.

Figure 4:
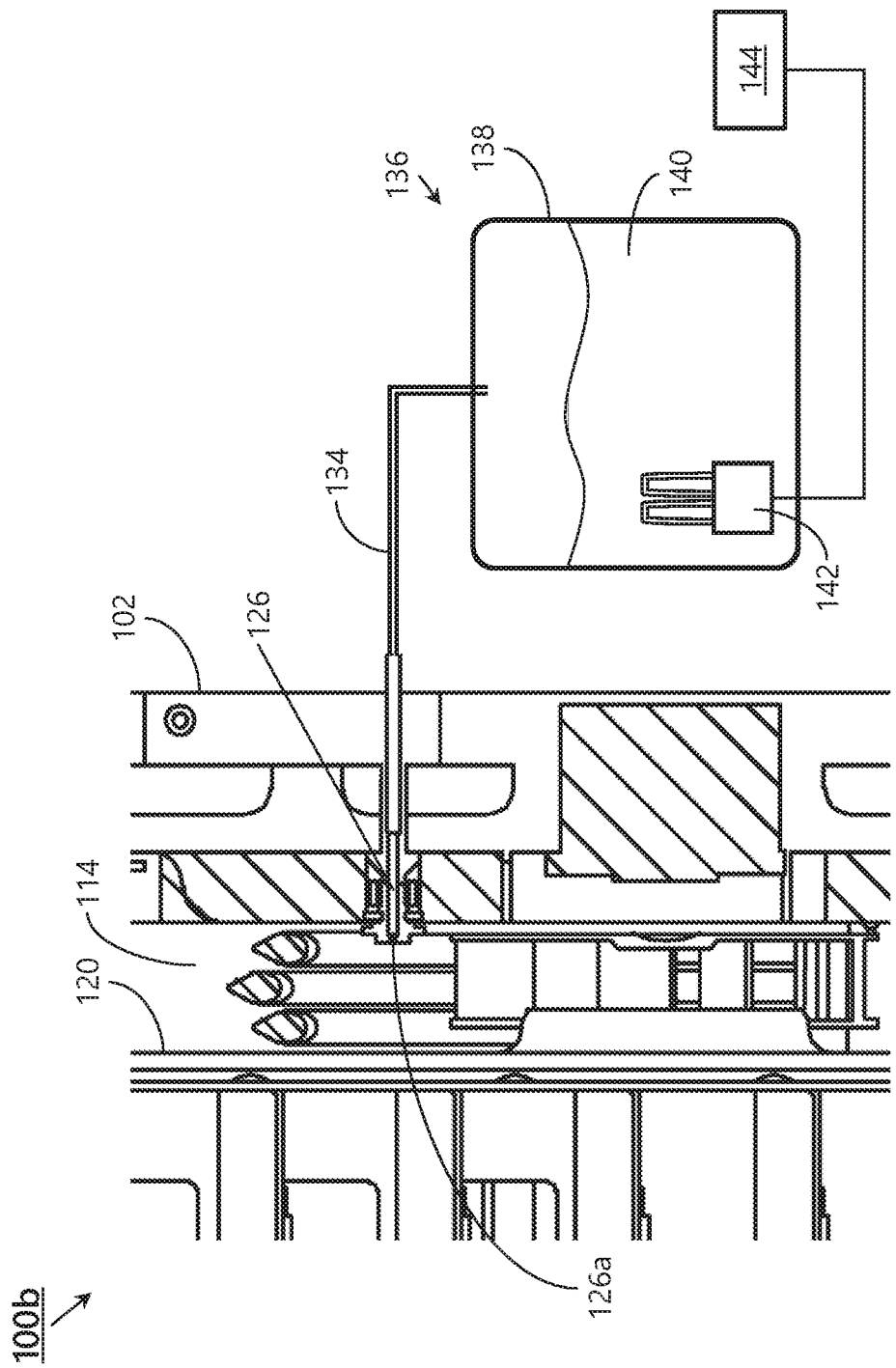
FIG. 4 is a partially diagrammatic view of the horizontal steam injector system of FIG. 1.

Referring to FIG. 4, the horizontal injector system 100b may be implemented and may function similarly to the horizontal injector system 100a of FIG. 2, except that the injector nozzle 126 of the horizontal injector system 100b may be supplied by a steam generator 136 external to the oven cavity 114. For example, a reservoir 138 may be disposed at or near the steam oven 102. The reservoir 136 may contain a supply of water 140 and a water heating element 142 coupled to a power supply 144 of the aircraft or vehicle within which the steam oven 102 is installed. Steam generated when the water 140 is heated by the water heating element 142 may be delivered to the injector nozzle 126 (e.g., via the supply tube 134) and injected into the oven cavity 114 (e.g., toward the baffle plate 120) through the ejection point 126a.

As will be appreciated from the above, embodiments of a horizontal steam injector system according to the inventive concepts disclosed herein improve upon the heating performance of pressurized steam ovens by more rapidly and efficiently distributing steam and heated water vapor throughout the interior of the oven while preventing condensate from collecting at the bottom of the oven, from where the liquid must be drained. Furthermore, by removing internal bends from the injector nozzle, the injector system is simplified, requiring fewer parts. Finally, the steam injector system is easier to clean and service. Scale collects on the baffle plate rather than inside the injector nozzle, where the scale accumulation will not impede the generation or injection of steam. In addition, the accumulated scale may be cleaned off the baffle plate without requiring the removal of any system components.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. A horizontal injector system for a steam oven, comprising:
    an oven cavity situated within a housing, the housing installable in a mobile platform, the oven cavity defined by a door and a plurality of interior surfaces, the door positioned on a front side of the housing and operable to access the oven cavity;
    at least one baffle plate configured to extend substantially vertically and parallel to a first interior surface of the plurality of interior surfaces;
    at least one fan disposed between the first interior surface and the baffle plate, the fan configured to distribute steam throughout the oven cavity;
    at least one injector coupled to a water supply and including a nozzle set into the first interior surface in a substantially horizontal orientation, the nozzle configured to inject at least one quantity of water from the water supply toward at least one contact point on the baffle plate;
    at least one meal carrier disposed within the oven cavity and configured to hold one or more meal trays, the baffle plate attached to the meal carrier;
    and
    at least one of the baffle plate or the fan including a collector disposed between the nozzle and the fan and beneath the at least one contact point, the collector including at least one of a curved surface or an inclined surface configured to direct an unevaporated portion of the injected water into the fan.

2. The horizontal injector system of claim 1, wherein the first interior surface is a rear interior surface opposite the door.

3. The horizontal injector system of claim 1, wherein the injector is attached to the first interior surface.

4. The horizontal injector system of claim 1, further comprising:
    a steam generator external to the oven cavity, the steam generator comprising:
        the water supply, including a reservoir capable of holding a volume of water;
        and
        a heating element operatively coupled to the reservoir and to a power supply of the mobile platform, the heating element configured to generate steam by heating the volume of water.

5. The horizontal injector system of claim 1, wherein:
the door is configured to maintain a pressure seal within the oven cavity when the door is in a closed state.

6. The horizontal injector system of claim 1, wherein:
the mobile platform includes an aircraft;
and
the housing is installable in a galley of the aircraft.

7. An aircraft steam oven, comprising:
    a housing installable in a galley of an aircraft;
    a door positioned on a forward side of the housing;
    an oven cavity situated within the housing and defined by the door and a plurality of interior surfaces, the door operable to access the oven cavity;
    at least one baffle plate configured to extend substantially vertically and parallel to a first interior surface of the plurality of interior surfaces;
    at least one fan disposed between the first interior surface and the baffle plate, the fan configured to distribute at least one of air and steam throughout the oven cavity;
    at least one injector coupled to a water supply and including a nozzle set into the first interior surface in a substantially horizontal orientation, the nozzle configured to inject at least one quantity of water from the water supply toward at least one contact point on the baffle plate;
    at least one meal carrier disposed within the oven cavity and configured to hold one or more meal trays, the baffle plate attached to the meal carrier;
    at least one of the baffle plate or the fan including a collector disposed between the nozzle and the fan and beneath the at least one contact point, the collector including at least one of a curved surface or an inclined surface configured to direct an unevaporated portion of the injected water into the fan;
    and
    at least one heating element proximate to the fan, the heating element configured to heat at least one of the air and the baffle plate.

8. The aircraft steam oven of claim 7, wherein the first interior surface is a rear interior surface opposite the door.

9. The aircraft steam oven of claim 7, wherein the injector is attached to the first interior surface.

10. The aircraft steam oven of claim 7, further comprising:
    a steam generator external to the oven cavity, the steam generator comprising:
        the water supply, including a reservoir capable of holding a volume of water; and
        a heating element operatively coupled to the water supply and to a power supply of the mobile platform, the heating element configured to generate steam by heating the volume of water.

11. The aircraft steam oven of claim 7, wherein:
the door is configured to maintain a pressure seal within the oven cavity when the door is in a closed state.

12. The aircraft steam oven of claim 7, wherein the housing corresponds to a galley insert.

* * * * *